United States Patent

[11] 3,609,353

[72] Inventors T. O. Paine
Acting Administrator of the National Aeronautics and Space Administration in respect to an invention of;
Frederick A. White, Schenectady, N.Y.
[21] Appl. No. 791,364
[22] Filed Jan. 15, 1969
[45] Patented Sept. 28, 1971

[54] COINCIDENCE APPARATUS FOR DETECTING PARTICLES
9 Claims, 9 Drawing Figs.
[52] U.S. Cl. .................................................. 250/49.5, 250/41.9, 250/71.5, 250/83.3, 250/207
[51] Int. Cl. .......................................................... G01t 1/16
[50] Field of Search ........................................... 250/41.9 R, 49.5 (O), 71.5, 83.3, 207

[56] References Cited
UNITED STATES PATENTS
3,041,453 6/1962 Daly .............................. 250/41.9
3,114,835 12/1963 Packard ........................ 250/106 X
3,320,419 5/1967 Thomas et al. ................ 250/71.5

Primary Examiner—James W. Lawrence
Assistant Examiner—Davis L. Willis
Attorneys—G. T. McCoy, Howard J. Osborn and William H. King ABSTRACT: This disclosure describes an apparatus for detecting particles. Particles, depending on their nature, pass through either an aperture in or the walls of a cylindrical cathode. The particles create secondary emissions when they impinge on the opposite side of the cathode from their point of entry. The secondary emissions pass out the ends of the cylindrical cathode, through apertures in anodes, and impinge on the electrodes or dynodes of electron multiplier tubes located adjacent to the apertures in the anodes. The output of the electron multiplier tubes are connected to a coincidence circuit. Due to the symmetry of the overall system, an equal number of secondary emissions are focused by an electrostatic field and impinge on each electron multiplier tube; hence, emissions lower than the noise level of a single electron multiplier tube can be detected.

INVENTOR.
FREDERICK A. WHITE

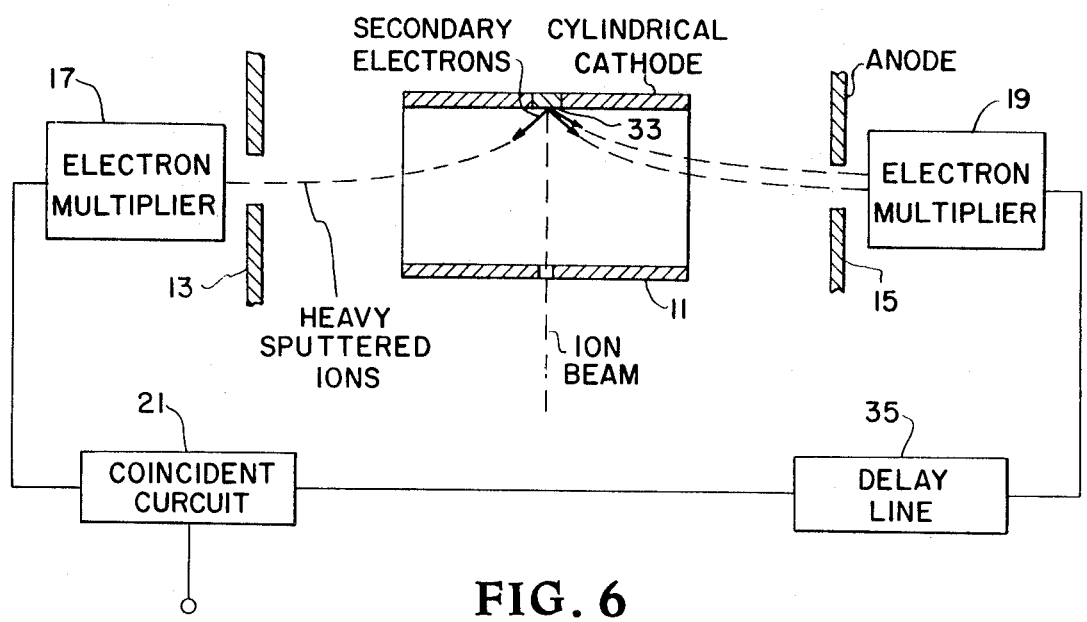
FIG. 6
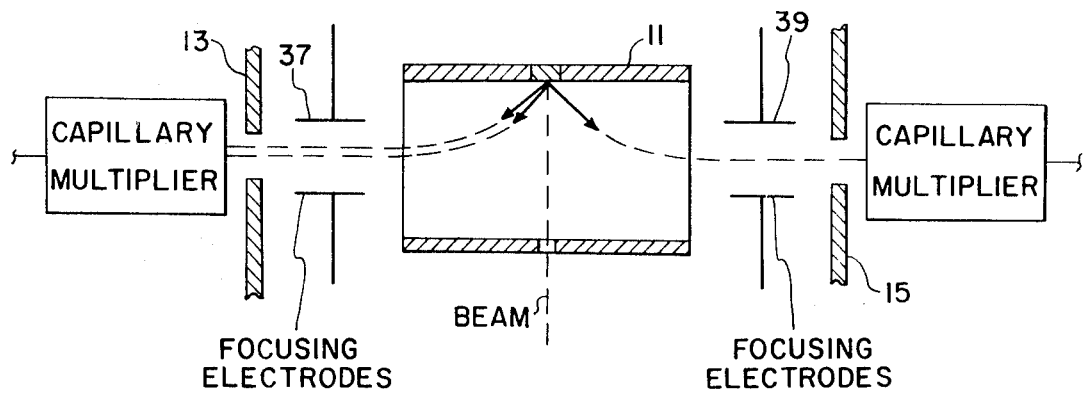
FIG. 7
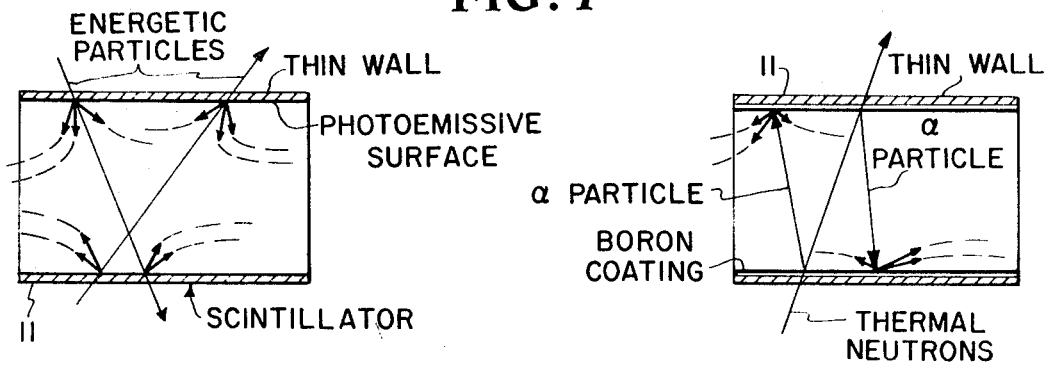
FIG. 8
FIG. 9

3,609,353

COINCIDENCE APPARATUS FOR DETECTING PARTICLES

The invention described herein was made in the performance of work under a NASA contract and is subject to the provisions of section 305 of the National Aeronautics Space Act of 1958, Public Law 85–568 (72 Stat. 435, 42 U.S.C. 2457).

BACKGROUND OF THE INVENTION

Detecting particles using a secondary emission effect is known in the art. Generally, a beam of ions, electrons or high energy particles, such as alpha particles, for example, are directed onto a surface that has secondary emission properties. For each ion, electron or particle that impinges on the surface, a plurality of secondary particles (usually electrons) are emitted. These particles are detected by suitable electron means, such as an electron multiplier tube, for example. In fact, very often the surface upon which the initial ion, electron or particle impinges forms a portion of the electron multiplier tube.

One of the problems with prior art energy particle detection apparatus of impinge foregoing type is that they can only detect particles that create a secondary emission that is above a particular energy level. The usual reasons for this failure is that there are too few impinging particles or the impinging particles have too low an energy level. The reason prior art apparatus cannot detect a single or a small number of particles, or low level particles, is that these particles create secondary emissions that are below the detecting level of the electron multiplier tube. More specifically, the thermal or "background" noise of single electron multiplier tubes is above the signals generated by the secondary emissions created when these particles impinge on the tubes. Hence, the secondary emissions caused by these particles are "lost" in the background noise and cannot be detected.

Therefore, it is an object of this invention to provide a new and improved apparatus for detecting particles such as electrons, ions, or alpha particles.

It is a further object of this invention to provide a new and improved apparatus using a secondary emission effect to detect a single, a small number, or low energy particles.

It is a further object of this invention to provide a new and improved apparatus for sensing the direction of a source of particles.

It is a still further object of this invention to provide a coincidence apparatus for detecting secondary emissions caused by particles bombarding a source that emits secondary particles.

It is yet another object of this invention to provide a new and improved apparatus for detecting secondary emissions that is simple and uncomplicated and can be utilized in various environments to sense various types of, including single and low energy, particles.

SUMMARY OF THE INVENTION

In accordance with a principle of this invention, an apparatus for detecting particles is provided. The particles to e detected may be ions, electrons, photons, and alpha particles, for example, having high or low energy levels. Single ions are also included. The particles to be detected pass through one wall of a cylindrical cathode and impinge on the other wall. When the particles impinge, they generate secondary emissions. The secondary emissions (which are particles) under the influence of an appropriate field, pass out the ends of the cylinder, through apertures in anodes located adjacent to the ends, and impinge on the surface of particle sensors located adjacent to the apertures in the anodes.

In accordance with another principle of the invention, the particle sensors have their outputs connected to a coincidence circuit to detect coincidence between the impinging of the secondary emissions on the surface of the sensors.

In accordance with a further principle of this invention, an aperture is located in the center of one wall of the cylindrical cathode, and the particles to be detected pass through the aperture and impinge on the wall of the cathode at a point opposite the aperture.

In accordance with still another principle of this invention, the point of particle impingement may be heated and/or thermally insulated from the remainder of the cathode. Further, the point of impinging may be of different composition than the remainder of the cathode.

In accordance with a further principle of this invention, the particle sensors are electron multiplier tubes and the secondary particles are electrons.

In accordance with a still further principle of this invention, the interior walls of the cylindrical cathode are coated with a predetermined material to enhance the number of secondary emissions generated by the particles to be detected.

It will be appreciated from the foregoing description that the invention provides an uncomplicated apparatus for sensing energy particles. The apparatus senses low level energy particles including single ions even though the secondary emissions generated by these particles create signals that are below the background noise level of the sensors. The reason for this result is that the invention utilizes a balanced coincidence method of determining when secondary particles are emitted. When coincidence due to secondary emissions between the pair of sensors occurs, an output indication is provided. If coincidence does not occur, a signal is considered to be background noise and is rejected. Hence, it is the use of a balanced system and coincidence detection that allows the invention to sense lower energy level particles and a lesser number of particles (including in some cases a single particle) than prior art detectors. It should also be realized that this system allows the detection of particles even when the electron multipliers are in a weak "radiation field" that would generate excessive "noise" (secondary electron emission) in a single multiplier.

It will also be appreciated from the foregoing summary of the invention that the apparatus of the invention is versatile. By heating and/or thermally insulating the impingement point, the invention can be modified for "best use," depending on the nature of the particles to be sensed or detected. In addition, by forming the point of impinging of a different material than the rest of the cathode, additional desirable effects are created. Moreover, by coating the inside of the cathode with various materials, the invention can be utilized to sense such particles as light photons passing through an aperture in the cathode. It will also be appreciated that, if desired, various focusing electrodes can be provided for focusing the output of the secondary emissions from the ends of the cathode through the apertures in the anodes onto the surface of the electron multiplier tubes.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 6 is an alternate embodiment of the invention;

FIG. 7 is an alternate embodiment of a portion of the invention; and

FIGS. 8 and 9 are further alternate embodiments of the cylindrical cathode of the invention.

DESCRIPTION OF THE PREFERRED EMBODIMENTS

Figure 1:
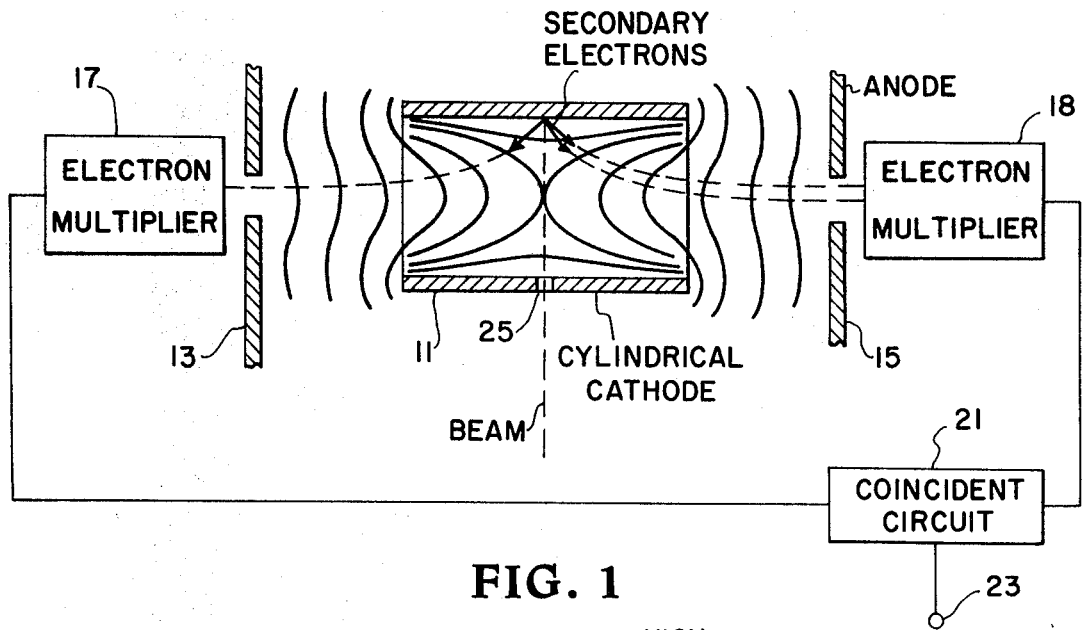
FIG. 1 is a pictorial diagram illustrating one embodiment of the invention.

Turning now to the drawings wherein like reference numerals designate like parts throughout the several views, FIG. 1 is a pictorial diagram of one embodiment of the invention and comprises a cylindrical cathode 11; first and second anodes 13 and 15; first and second electron multiplier tubes 17 and 18; and, a coincidence circuit 21. The anodes 13 and 15 are mounted opposite the ends of the cylindrical cathode 11. Apertures are contained in the first and second anodes 13 and 15 which intersect the longitudinal axis of the cylindrical cathode.

The first and second electron multiplier tubes 17 and 18 are located one on each side of the anode apertures, opposite from the cylindrical cathode. The electron multiplier tubes are adapted to sense secondary particles (usually electrons) emitted from the cathode that pass through the apertures in the anodes. The output from the first and second electron multiplier tubes 17 and 19 are connected to inputs of the coincidence circuit 21. The output from the coincidence circuit 21 is connected to an output terminal 23. An aperture 25 is contained in one wall of the cylindrical cathode 11. Particles to be detected pass through the aperture 25 in the cylindrical cathode and impinge on the opposite wall of the cylindrical cathode in the manner illustrated in FIG. 1. When the particles impinge, secondary emissions are created.

It will be appreciated from viewing FIG. 1 that the overall system is symmetrical about the cylindrical cathode. In operation, the particle beam, which may be a narrow ion beam emitted from the detector end of a mass spectrometer, for example, passes through the aperture 25 in the cylindrical cathode 11. The aperture or slit, which preferably is very small, allows the ion beam to penetrate the interior of the cylindrical cathode 11 and strike the opposite inner wall of the cathode. When the beam strikes the opposite inner wall of the cathode, secondary electrons are emitted. If the cylindrical cathode 11 is at ground potential and the anodes 13 and 15 and the first dynode of the electron multiplier tubes 19 are balanced at a few hundred volts positive, the secondary electrons emerge into a field-free region of the cathode. These electron have only a mean energy of a few electon volts, if the electron beam is a single ion beam or a low energy ion beam.

The spatial distribution of the electrons approximates a "cosine" distribution such that an equal number of electrons (on the average) are emitted with component velocities toward the first electron multipliers 17 and the second electron multiplier 18. Hence, each electron multiplier (on the average) senses the same number of secondary electrons.

More specifically, because of the voltage difference between the cylindrical cathode 11 and the anodes 15, an electric field, represented by the wavy lines illustrated in FIG. 1, extends into the cylinder. The electric field is symmetrical about both sides of the cylinder. Because geometric and electric symmetry exists, it will be clear to those skilled in the art that, on the average, an equal number of electrons are directed to each of the electron multiplier tubes 17 and 18. It will also be appreciated by those skilled in the art and others that, because secondary electron kinetic energies are small (approximately 4 ev.), focusing voltages of only a few hundred volts are sufficient to channel the electrons through the apertures in the anodes to the first electrode or dynode of the electron multiplier tubes.

Assuming that a sufficient number of secondary electrons are emitted, the two electron multiplier tubes respond in coincidence and their coincident output pulses are fed to the coincidence circuit 21. When this occurs, an output signal is applied to the output terminal 23 to indicate the occurrence of the coincidence pulses which in turn is an indication of the emission of secondary electrons caused by the beam impinging on the opposite wall of the cathode.

If the number of secondary electrons generated within the cylinder is high (for example, 10 ev.), the invention has an efficiency value close to 100 percent. However, even if the number of secondary electrons generated is low (for example, 3 ev.), the invention has distinct advantages over prior art apparatus. Specifically, the occurrence of coincidence is easy to detect even though the background current generated is of the same level or lower than the current created by the secondary emissions. More specifically, the thermionic or background current generated in an electron multiplier tube is often of the same general level as the current generated when the number of secondaries is low. Hence, the detection is lost in the "noise" when only one electron multiplier tube is used, as in prior art apparatus. However, because the invention uses two tubes and detects coincidence between the electron secondary currents hitting the first and second multiplier tubes, lower level detection currents can be sensed. That is, coincidence as opposed to an actual pulse is detected, and coincidence is detectable at a lower secondary emission level than is the actual existence of a pulse.

It will be appreciated from the foregoing description that the invention provides a novel and uncomplicated apparatus for detecting energy particles, such as single ion particles, beamed into the cathode 11. The invention merely requires a cylindrical cathode with an aperture or slit in one side. The particles to be detected pass through the slit and generate secondary electrons when they impinge on the other side of the cylindrical cathode. The secondary electrons are directed through apertures in anodes located adjacent the ends of the cylindrical cathode. On the opposite side of the anode apertures are electron multiplier tubes which sense the secondary electrons. Due to electrical and geometric symmetry, there is coincidence and equality between the number of electrons reaching each tube; hence, the currents generated by these electrons in the electron multiplier tubes are equal. The outputs from the electron multiplier tubes are detected in coincidence, thereby making the overall system operable at much lower particle energies than prior art apparatus.

The embodiment of the invention illustrated in FIG. 1 can detect single ions of energies that range from approximately 5 kev. to 50 kev., if the cathode material provides a large number of secondary electrons per electron volt material such as aluminum oxides, many metals and oxides of such metals, semiconductors, compound surfaces such as of alkali metals, or virtually any surface that gives adequate "secondary electrons" upon particle compact will provide a sufficiently large number of secondary electrons. In addition, the embodiment of the invention illustrated in FIG. 1 can detect single electrons in the several hundred electron volt range when secondary electron yields are maximized (such as by adding focusing electrodes between the cathode and the anodes). In addition, the invention will detect particles of lower energy levels if the cathode-anode potentials are biased by appropriate voltages to maximize the secondary electron yield. For example, a single 10 volt ion can be detected if a post-accelerating scheme causes the ion to strike the cathode at 10 kev. Similarly, a single high energy electron can be detected if the electron is made to strike the cathode at an energy that maximizes the secondary electron yield.

Figure 2:
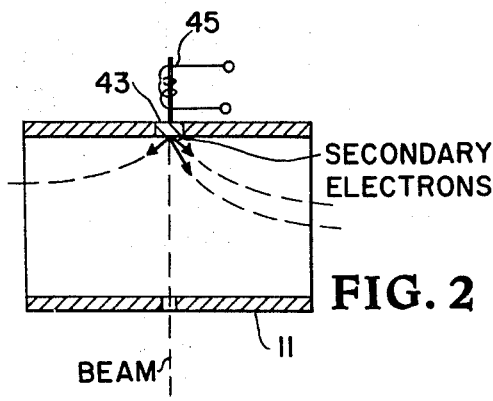
FIGS. 2, 3, 4 and 5 are pictorial diagrams of alternate embodiments of the cylindrical cathode.

FIG. 2 illustrates an alternate embodiment of a cylindrical cathode 11 suitable for use in the embodiment of the invention illustrated in FIG. 1. In FIG. 2 the section of the cylindrical cathode upon which the beam impinges is replaced by a small cathode material region 43 that is electrically and thermally insulated from the remainder of the cylindrical cathode. In addition, the auxiliary heater 45 is included so that the small cathode material region 43 generates a large number of thermionic electrons. These electrons move in equal numbers toward the first and second electron multipliers if the system is balanced, as illustrated in FIG. 1. Because the thermionically emitted electrons have very low energy levels, a voltage divider (not shown) that furnishes potentials to all surfaces (cathode, anodes, accelerating electrodes, etc.) can be easily set. In this manner, equal electron currents are made to proceed to right or left without excessive care in the construction of the invention. More specifically, a voltage divider can be easily utilized with the FIG. 2 embodiment to balance the system without taking great care in constructing an exactly symmetrical system. The further advantage of this embodiment of the cylindrical cathode is that the heated secondary emitting spot can be activated to maximize yield and to be an aid in cleaning (when necessary).

Figure 3:
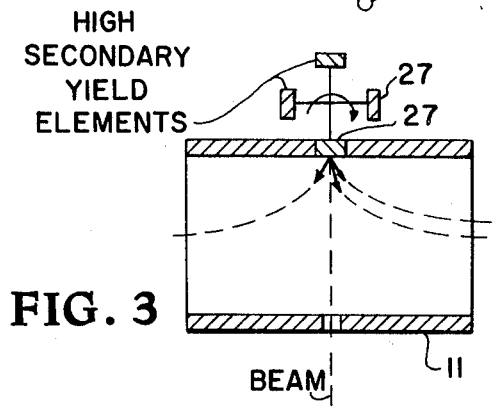

FIG. 3 illustrates another embodiment of the cathode of the invention. As with the FIG. 2 embodiment of the cathode, the FIG. 3 embodiment includes a separate cathode region for impinging particles. The difference between the two embodiments is the FIG. 3 embodiment includes a plurality of separate regions 27 mounted on a "ferris wheel" arrangement which can be mechanically rotated by means (not shown) to move the regions into and out of an aperture in the cylindrical cathode. The regions are preferably formed of light secondary yield elements, and the aperture holding the regions is mounted in the wall of the cathode opposite the beam aperture. The regions 27 can be of different natures such that they yield high numbers of secondary particles for different incident particles. The system can be mounted in a vacuum enclosure (if desired) and the wheel can be rotated to move the desired high yield element into the aperture from outside the vacuum system without exhausting the vacuum. It should also be noted that this embodiment can be utilized to extend the life of the overall system. That is, if a particular cathode surface is "poisoned" by an excessive electron beam, a new cathode surface can be moved into the aperture to continue the operation of the overall system without exhausting the vacuum.

Figure 4:
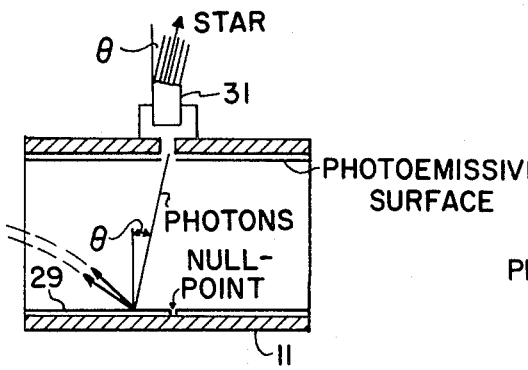

FIG. 4 illustrates an embodiment of the cylindrical cathode wherein the inner surface 29 surface. the cathode is coated with a photoemissive material. An optical system 31 is located adjacent the beam aperture or slit in the cylindrical cathode 11. The optical system 31 focuses light from a star, for example, through the beam slit onto the photoemissive material located on the wall of the cylindrical cathode opposite the slit. If the optical system is pointing directly at the star, an equal number of secondary electrons is emitted to each electron multiplier tube 17 and 19 if the photoemissive material entirely covers the opposite surface. If desired, as illustrated in FIG. 4, a null point can be located on the opposite surface or wall exactly opposite the beam slit so that no secondary electrons are emitted when the optical system is pointing directly at the star. In either case, if the optical system is not pointed directly at the star (that is, it is off center), then more secondary electrons are emitted toward one electron multiplier tube than toward the other electron multiplier tube. Thus, the apparatus of the invention can be used for star tracking in a guidance system.

Figure 5:
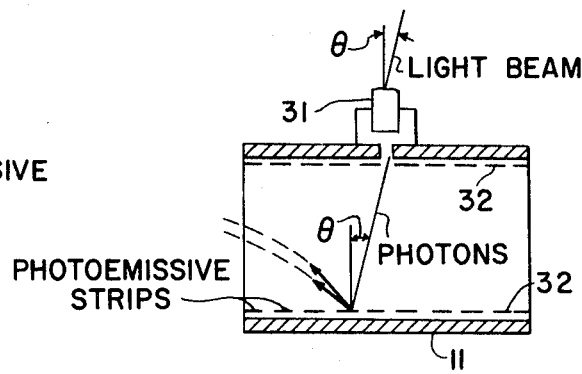

The embodiment of the cathode illustrated in FIG. 5 is generally similar to the embodiment illustrated in FIG. 4, with the difference that the photoemissive surface is replaced by a plurality of photoemissive strips or laminates. This embodiment allows the rate of rotation of the overall system past a light source to be observed as a modulated signal. A correlation between the frequency of the signal and the angular deviation can be computed, as will be understood by those skilled in the art, to obtain an indication of the rate of movement.

FIG. 6 illustrates an alternative embodiment of the invention that is suitable for correlating the number of sputtered positive ions detected in one direction to the number of secondary electrons focused in the other direction when a particle impinges on the cathode wall. The embodiment illustrated in FIG. 6 is generally similar to the embodiment illustrated in FIG. 1, except that the cathode includes a small, separate region aligned with the beam aperture that is formed of a different material than the remainder of the cylindrical cathode. Suitable deflection means (not shown) deflect the heavy sputtered ions to the left as viewed in FIG. 6, while suitable focusing means (also not shown) focus the emitted secondary electrons to the right. The focusing means may be focusing electrodes of the type illustrated in FIG. 7 and hereinafter described, and the deflection means may be an appropriate voltage differential between the left anode and the cathode. The embodiment illustrated in FIG. 6 is also modified by including a delay line 35 between the second or right electron multiplier tube 19, which receives the secondary electron emission, and the coincidence circuit. The delay line is necessary because of the shorter electron transit time, i.e., the time it takes the electrons to move from the region 33 to the electron multiplier tube 19 is shorter than the period of time it takes for the heavy sputtered ions to move from the region 33 to the electron multiplier tube 17. Suitable adjustment of the delay line 35 results in both signals arriving at the coincidence circuit 21 at the same time.

FIG. 7 illustrates a further alternate embodiment of the invention wherein focusing electrodes 37 and 39 are mounted between the ends of the cylindrical cathode 11 and the first and second anodes 13 and 15. In addition, located opposite the apertures in the anodes are capillary multiplier tubes rather than electron multiplier tubes. It will be appreciated by those skilled in the art that capillary multiplier tubes are smaller than electron multiplier tubes. The embodiment illustrated in FIG. 7 results in improved secondary electron focusing because of the focusing electrons 37 and 39. It is an exceedingly rugged and uncomplicated system that can be utilized for ion analysis, for example. It is small and light in weight; hence, it is useful in remote environments where weight is an important factor. For example, the entire apparatus can be packaged so that it will weigh only a few ounces; hence, it is useful in satellites or sounding rockets for research in the upper atmosphere.

FIGS. 8 and 9 illustrate further embodiments of the cylindrical cathode 11 wherein the beam aperture is omitted and the wall of the cathode is thin. In FIG. 8, the inner surface of the cathode is covered with a photoemissive material. When the cathode is placed in an energetic particle environment (for example, a high energy beta particle environment), the energetic particles pass through the thin walls of the cylindrical cathode and emit secondary electrons from both inner photoemissive surfaces. The secondary electron emission is detected by a pair of electron multiplier or capillary multiplier tubes in the manner heretofore described. In FIG. 9, the inner wall of the cylindrical cathode is covered with a boron coating. When a particle, such as a thermal neutron, for example, passes through the thin wall, alpha particles are emitted from the boron coating at the points of passage. The alpha particles impinge at points on the opposite surface of the wall. The alpha particle impinging causes the emission of secondary electrons which are detected by electron multiplier tubes in the manner heretofore described.

It will be appreciated from the foregoing description of the invention that the basic embodiment of the invention illustrated in FIGS. 1, 6 and 7 can use any of the cylindrical cathodes illustrated and described, as desired. The structure of the cylindrical cathode, i.e., whether it has an aperture or not, or whether it has a special region for emitting electrons or ions is determined by the particles to be detected. The basic structure results in the ability to detect single ions or low energy particles. However, the invention can be utilized with high energy particles for comparison purposes. In addition, the invention can be used as a light detecting means to provide a star-tracking device for guidance systems.

It will be appreciated by those skilled in the art and others that the foregoing description has only described preferred embodiments of the invention and that other embodiments can be formed in accordance with the general description. For example, other generally symmetrical geometric structures similar to the basic system can be utilized. In addition, other particles than those specifically described can be detected and different types of electron or particle detectors, other than electron multipliers, can be used.

The invention can be utilized to detect single ions having a wide range of kinetic energies and uncharged heavy atoms with high efficiency. The invention will detect single electrons at maximum secondary yield energies (hundreds of electron volts). Because of the cylindrical geometry of the cathode, perfect symmetry in the collection of secondary electrons is provided by the invention, allowing a coincidence method to be used to detect low level particles. Further, the invention can be used to improve discrimination in a radiation environment where single electron multiplier tubes cannot be used. The invention is rugged and, therefore, suitable for use in extreme environments, such as on a space vehicle, for example. Moreover, the invention can be utilized in a pulsed mode or in a DC mode. Finally, the invention can be used with high-pressure systems (if differential pumping is applied beyond the slit or aperture in the cylindrical cathode).

What is claimed is:

1. Coincidence apparatus for detecting particles comprising:
    a cathode having a hollow cylindrical design with open ends;
    an aperture in the wall of said cathode through which the particles to be detected pass and strike the inner surface of the wall of the cathode, said aperture being and equal distance from the open ends of said cathode;
    a first anode having an aperture located adjacent to one open end;
    a second anode having an aperture located adjacent to the other open end;
    a first sensor mounted on the opposite side of the aperture in said first anode from said cathode so as to detect secondary emission from said cathode that passes through the aperture in said first anode; and,
    a second sensor mounted on the opposite side of the aperture in said second anode from said cathode so as to detect secondary emission from said cathode that passes through the aperture in said second anode.

2. Coincidence apparatus for detecting particles as claimed in claim 1, including a separate area of different material formed in the wall of said cylindrical cathode at a point opposite said aperture in said cylindrical cathode.

3. Coincidence apparatus for detecting particles as claimed in claim 2, wherein said first and second sensors are electron multiplier tubes.

4. Coincidence apparatus for detecting particles as claimed in claim 3, including heating means for heating said separate area.

5. Coincidence apparatus for detecting particles as claimed in claim 4, wherein said separate area includes a plurality of separate sections moveable into and out of an aperture in said cylindrical cathode located at a point in said cylindrical cathode opposite the aperture through which particles to be detected pass.

6. Coincidence apparatus for detecting particles as claimed in claim 3, including focusing electrodes located between the ends of said cylindrical cathode and said anode.

7. Coincidence apparatus for detecting particles as claimed in claim 3, including a coincidence circuit having one input connected to the output of said first-particle sensor and a second input connected to the output of said second-particle sensor.

8. Coincidence apparatus for detecting particles as claimed in claim 7, including a delay line connected between the output of said second electron multiplier tube and an input of said coincidence circuit.

9. Coincidence apparatus for detecting particles as claimed in claim 2, wherein said first and second sensors are capillary multiplier tubes.